Oct. 23, 1951 W. A. MELSOM 2,572,645
FLEXIBLE HOSE COUPLING
Filed July 12, 1947
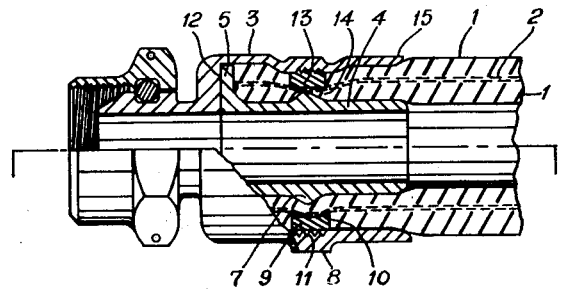
Fig. 1
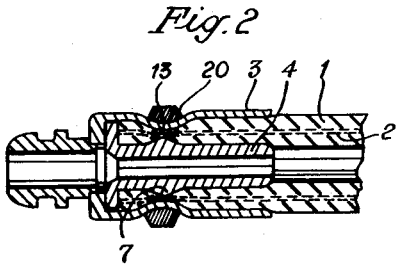
Fig. 2
Fig. 3
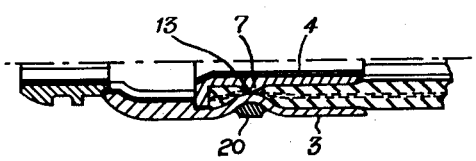
Fig. 4
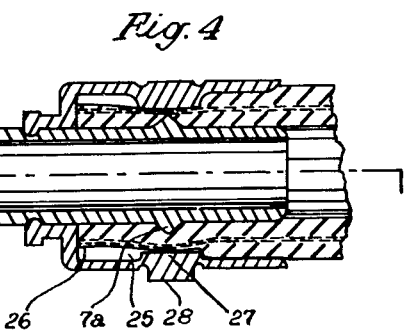
Fig. 5
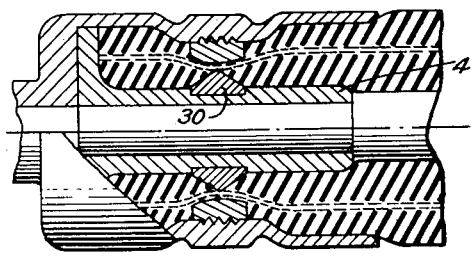
Fig. 6
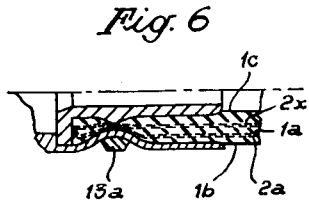
INVENTOR
Walter Arthur Melsom
Albert F. Nathan Atty Patented Oct. 23, 1951

2,572,645

UNITED STATES PATENT OFFICE 2,572,645

FLEXIBLE HOSE COUPLING

Walter Arthur Melsom, Wembley, England, assignor to Bowden (Engineers) Limited, London, England Application July 12, 1947, Serial No. 760,664
In Great Britain June 3, 1946

Section 1, Public Law 690, August 8, 1946
Patent expires June 3, 1966

6 Claims. (Cl. 285—84)

The present invention relates to improvements in flexible hose coupling components employed for example for the hydraulic transmission of power, or for the conveyance of gases, liquids, semi-solids or viscous substances, and wherein a flexible hose having tubular layers of resilient material such as rubber in various forms, natural or synthetic, reinforced by one or more intervening tubular layers of reinforcing material, is gripped between a sleeve and an insert.

With couplings of this kind it is necessary to seal the hose to the coupling sufficiently tightly to prevent the escape of any fluid, and also to grip the hose between the sleeve and insert with sufficient force to prevent any risk of its being blown off axially by internal fluid pressure and with the aim of achieving these ends we have described and claimed in our prior Patent No. 2,374,225 coupling components produced by contracting the sleeve so as to form a sealing zone and contracting the sleeve at a separate clamping zone situate between the sealing zone and the end of the hose, so as to displace sideways the resilient material of the inner and outer layers in such zone so as to bare both sides of the reinforcing layer and to produce a powerful grip of the sleeve and insert on the bared portion which does not depend on the resilient material.

It is necessary to ensure that fluid under pressure shall not have access to the reinforcement, so as to avoid internal pressure being set up within the wall of the hose, and it has hitherto been considered necessary, in the foregoing and other proposals where the reinforcement, bared of the resilient material, is gripped, to take separate steps (1) to seal the hose to the coupling and (2) to clamp the reinforcement.

The object of the present invention is to reduce the contracting work done on the sleeve and to shorten the sleeve and produce a lighter weight coupling.

The present invention is characterised in that by one and the same local medial contraction of the sleeve are produced (a) a clamping zone where, by displacing rubber of the inner layer and rubber of the outer layer or layers if such outer rubber is not already wholly or partly already removed, the reinforcing material is substantially bared of the resilient material and is gripped and (b) a sealing zone adjoining said clamping zone between sleeve and insert situated on the side of the clamping zone nearer to the open end of the coupling, i. e., the end which projects furthest over the hose.

I have obtained good results when the hose comprises inner and outer resilient layers bonded to a single layer of elastic metal braiding with or without an adjacent contiguous layer or layers of fabric, by contracting the sleeve so that the metal braiding is bared and gripped directly by the sleeve and the insert, i. e., the inner surface of the braiding is in direct contact with the insert and the outer surface is in direct contact with the sleeve, and the rubber or the like of both the inner and outer layers is displaced as a result of such contraction in order to bare the braiding.

I prefer, however, in order to prevent undue deformation of the sleeve and possible risk of fracture and to promote a more reliable product, to situate a ring or band not harder than the reinforcing material in an external groove or recess in the hose, which ring or band is contracted as a result of contracting the sleeve, to produce a clamping zone where by displacing the rubber of the inner layer, the reinforcing material is substantially bared and gripped and produces, a sealing zone adjoining said clamping zone between the sleeve and insert situated on the side of the clamping zone nearer the open end of the coupling.

Preferably the groove or recess bottoms on the reinforcing material before contraction of the ring or band. Such ring or band is preferably formed separate from the sleeve, although it may be formed as an integral inner projecting ring or band of the sleeve.

The clamping and sealing zones may be produced by a local contraction of the sleeve around one or more annular ridges on the insert.

A member may be interposed between the hose and the insert, or a member may be interposed between the sleeve and the hose and another between the hose and the insert, so that the reinforcement becomes gripped between such a member and either the sleeve or the insert, or between two separate members, as the case may be.

Where the hose is reinforced by non-metallic materials e. g., fabrics, it may be advantageous to provide for the sleeve to contract a soft material, e. g., lead or plastics, arranged round the reinforcement, e. g., in a groove formed in the hose such as by cutting away a local ring of the material of the outer layer of the hose, so as to minimise the risk of the reinforcement being ruptured or unduly weakened as a result of the contracting operation.

It may in some cases be convenient to provide between the insert and the reinforcement a separate ring providing the desired ridge or ridges and such a member may be suitably arranged on or fixed to the insert, and if desired such member may be of soft metal.

In cases where the hose has two or more reinforcing layers each surrounded by an outer layer of resilient material, the rubber of the outer layers (if not already wholly or partly removed) as well as of the inner layer is displaced in order substantially to bare and bring together the reinforcing layers where they are gripped at the clamping zone.

The ridge forming portion of the insert (or the separate ridge-forming member aforesaid) is conveniently of a blunt wedge form, e. g., forming an obtuse-angled apex.

The sleeve may be a cylinder of uniform wall thickness, internally serrated or not as desired, or it may have an externally thickened band, or a separate ring may be arranged round the sleeve where this is to be contracted and the sleeve contrated by contracting said ring. A thickened band or an external ring may be desirable to facilitate contraction by radial closing dies of simple form or contraction by passing the coupling axially through a suitably shaped die.

Although little or no pressure need be exerted by the sleeve on the hose except locally where it is contracted as aforesaid, it may be desirable to prevent any expansion of the portion of the sleeve between such contracted zone and the open end of the sleeve, and for this purpose such portion may be of substantial length and may be constrained externally, or even contracted slightly, during the aforesaid contraction.

In order that the present invention may be the more clearly understood, reference is hereinafter made to the accompanying drawings, in which:

Fig. 1 is a longitudinal section of one form of coupling made according to the present invention.

Fig. 2 is a similar view of another form of coupling according to the invention, Fig. 3 is a sectional view of another form.

Fig. 4 is a longitudinal section of yet another form and Fig. 5 is a part section of a modified form of coupling according to the present invention.

Fig. 6 is a part longitudinal section of another modification.

Referring to Fig. 1 the hose comprises inner and outer layers 1 of rubber and an intervening tubular reinforcing layer 2 made up of multiple fine steel wires laid side by side to form bands which are braided to form the tube. To the end of the hose is clamped an end fitting which comprises a sleeve or ferrule component 3 and an insert component 4 having a flange 5. The fitting may be constructed in a variety of ways for making a sealing union with a companion part, but in the form shown the sleeve and insert are separate members and a union nut 6 is rotatably supported by a boss on the sleeve.

The insert is provided with an annular ridge 7 of obtuse-angled wedge form and the sleeve or ferrule is provided with an annular swaging ring or band 8.

To prevent undue deformation of the ferrule and possible risk of fracture, a band or ring 9 of softer material than the reinforcing material, e. g., soft metal, is arranged in an annular groove 10 which is formed in the hose in a position to lie around the ridge on the insert. The groove is formed by removing rubber of the outer layer so that the band or ring will bottom on the reinforcing material. The inner wall of the sleeve is preferably grooved or serrated at 11 where it is to surround the ring or band.

The insert is inserted into the hose and the ferrule passed over the end of the insert and hose so that the shoulder 12 of the end wall of the ferrule abuts the flange of the insert. The swaging ring then surrounds the ridge as shown in the bottom half of Fig. 1, and is contracted by any suitable or known method so as to force inwards and permanently deform a local part of the cylindrical wall or sleeve of the ferrule to such an extent that the rubber of the inner layer is displaced to bare the reinforcing material thereof, the reinforcing material now bared on both sides being clamped as shown in the upper half of the view, between the ring or band 9 and the crest of the ridge 7. The clamping zone is marked 13.

The reinforcing material is also forced inwards and rubber of the inner layer of the hose is wedged between such material and the ridge to produce a zone of maximum sealing pressure at 14 between the sleeve and the insert, this zone adjoining the clamping zone and sealing the coupling on the side of such zone nearer the open end of the coupling.

The sleeve from where it is indented in the contracting operation at the clamping zone to the open end 15 is subjected to little or no contracting pressure, although it may be constrained externally during the contracting operation, against any tendency to expand.

The coupling is particularly successful where the reinforcing material is of steel wire braiding, the forcing in of which at the clamping zone causes the rubber at the sealing zone to be tightly wedged between the reinforcement and the ridge.

Fig. 2 shows another form of coupling component according to the invention. This form shows how a separate swaging ring 20 may be used. This ring may be arranged around the sleeve and if desired brazed or otherwise secured thereto. The figure also shows a modified construction of the fitting for external connection.

Fig. 3 shows another form of coupling component according to the invention, in which the ring or band 9 is omitted and by contraction of the sleeve the rubber of the outer layer as well as that of the inner layer is displaced in order to bare the reinforcing material.

Fig. 4 shows another modified form. The hose is externally recessed at 25 by removing an end portion of the outer rubber layer, and this recessing may take place down to the reinforcing material, or a thin layer 26 of rubber may be left which helps to hold in the braided reinforcement during subsequent contraction. The sleeve or ferrule is provided with an internal annular band 27 and with an external annular band 28, the internal band being received in the recess 25 around the ridge 7a of the insert, and the external swaging band being swaged down so that the rubber of the inner layer is displaced and the reinforcing layer bared of such rubber. If a thin sleeve of rubber is left in the bottom of the recess, it tends to get driven into the interstices of the reinforcement or sideways, especially above the crest of the ridge, and for all practical purposes at the clamping zone the reinforcing material is bared on both sides.

Fig. 5 shows a modified form of coupling in which the ridge is formed by a separate ring 30 such as of soft metal.

In the form shown in Fig. 6 the hose has two reinforcing layers, e. g., of metal braiding, 2, 2a each surrounded by an outer layer 1a, 1b, the rubber of which and of the inner layer 1c is displaced at the clamping zone 13a so that both layers of reinforcing material are substantially bared and brought together and gripped.

The use of internal or external rings of softer material than the reinforcing material promotes interlock of the rings with the reinforcement; the external ring if of suitable material can also be made to interlock with internal grooves or serrations of the sleeve.

Where the reinforcement is a fabric material the separate members may be chosen of a suitable softness to minimise the risk of the reinforcement being ruptured or unduly weakened as a result of the contracting operation.

What I claim is:

1. A flexible hose coupling component comprising a sleeve and an insert and a hose having tubular layers of rubber or like resilient material and intervening tubular reinforcing material, an external groove or recess in the hose, and a ring situated in said external groove or recess, said insert having at least one annular ridge under said ring and proud of the external surface of the insert within the hose, said sleeve being locally contracted as an internal bulge at one region only, this region being situate around the ring, to produce a sole clamping zone where by displacing the remaining rubber of the hose under the ring the reinforcing material is substantially bared thereof and is directly gripped between said ring and said ridge and to produce adjoining said clamping zone a sealing zone between the sleeve and insert situated on the side of the clamping zone nearer the open end of the coupling.

2. A flexible hose coupling component according to claim 1, in which said ridge is of blunt obtuse angled wedge form in cross section and the reinforcing material is gripped on the crest thereof.

3. A flexible hose coupling component comprising a sleeve and an insert and a hose having tubular layers of rubber or like resilient material and intervening tubular reinforcing material, an external groove or recess in the hose and a metallic ring separate from the hose arranged therein, said insert having a body portion and an annular metallic member softer than and axially fixed to said body member, said annular member providing the insert with an annular ridge, said sleeve being locally contracted as an internal bulge at one region only to displace the rubber from between said ring and said ridge so as to produce a clamping zone where the reinforcing material is directly gripped between said ring and said ridge, and to produce an adjoining sealing zone.

4. A flexible hose coupling component comprising a sleeve and an insert and a hose having at least one tubular layer of braided metal wire reinforcing material embedded between tubular layers of rubber or like resilient material, said insert having an annular ridge and said sleeve being locally contracted as an internal bulge in one region only so as to displace the rubber from under the said contracted part of the sleeve and produce a clamping zone where and only where the reinforcing material is substantially bared of rubber both inside and outside, and is gripped between the sleeve and said ridge and to produce a sealing zone adjoining the clamping zone between sleeve and insert situated on the side of the clamping zone nearer the hose end of the sleeve.

5. A flexible hose coupling component comprising a sleeve and an insert and a hose having at least one tubular layer of braided metal wire reinforcing material embedded between tubular layers of rubber or like resilient material, an external groove or recess in the hose which bottoms on the wire material so that this is externally bared, a separate ring of metal softer than the wire arranged therein, an annular ridge on said insert disposed under said ring and proud of the external surface of the insert within the hose, said sleeve being locally contracted as an internal bulge at one region only, which region is situated around said ring, to produce a clamping zone where by displacing the remaining rubber of the hose under the ring, the reinforcing material is also bared internally, and is directly gripped between the metallic ring and the annular ridge and to produce a sealing zone adjoining said clamping zone between the sleeve and insert situated on the side of the clamping zone nearer the open end of the coupling.

6. A flexible hose coupling component comprising a sleeve and an insert and a hose having at least one tubular layer of braided metal wire reinforcing material embedded between tubular layers of rubber or like resilient material, an external groove or recess in the hose, said sleeve being internally formed with a projecting ring intruding into said groove or recess, an annular ridge on said insert disposed under said ring and proud of the external surface of the insert within the hose, said sleeve being locally contracted as an internal bulge at one region only, which region is situated around said ring, to produce a clamping zone where by displacing the remaining rubber of the hose under the ring, the reinforcing material is bared and is directly gripped both internally and externally between said ring and said annular ridge and to produce a sealing zone adjoining said clamping zone between the sleeve and insert situated on the side of the clamping zone nearer the open end of the coupling.

WALTER ARTHUR MELSOM.

REFERENCES CITED

The following references are of record in the file of this patent:

UNITED STATES PATENTS

| Number | Name | Date |
|---|---|---|
| 1,491,892 | Weis et al. | Apr. 29, 1924 |
| 2,374,224 | Melsom | Apr. 24, 1945 |
| 2,374,226 | Melsom | Apr. 24, 1945 |
| 2,384,635 | Melsom | Sept. 11, 1945 |